(12) United States Patent
Hasting et al.

(10) Patent No.: US 9,303,531 B2
(45) Date of Patent: Apr. 5, 2016

(54) QUICK ENGINE CHANGE ASSEMBLY FOR OUTLET GUIDE VANES

(71) Applicant: General Electric Company, Schenectady, NY (US)

(72) Inventors: William Howard Hasting, Cincinnati, OH (US); Courtney James Tudor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 849 days.

(21) Appl. No.: 13/652,962

(22) Filed: Oct. 16, 2012

(65) Prior Publication Data

US 2014/0140832 A1    May 22, 2014

Related U.S. Application Data

(60) Provisional application No. 61/568,976, filed on Dec. 9, 2011.

(51) Int. Cl.
*F01D 9/04*    (2006.01)
*F01D 25/24*    (2006.01)

(52) U.S. Cl.
CPC ............. *F01D 25/246* (2013.01); *F01D 9/04* (2013.01); *F01D 9/042* (2013.01); *F05D 2240/12* (2013.01); *F05D 2300/6033* (2013.01); *Y02T 50/672* (2013.01); *Y02T 50/673* (2013.01)

(58) Field of Classification Search
CPC ....... F01D 5/30; F01D 5/3007; F01D 5/3023; F01D 5/3038; F01D 5/3046; F01D 5/32; F01D 5/323; F01D 5/326; F01D 9/02; F01D 9/04; F01D 9/042; F01D 9/044; F01D 25/24; F01D 25/243; F01D 25/246; F05D 2240/12; F05D 2240/128; F05D 2240/14
See application file for complete search history.

(56) References Cited

U.S. PATENT DOCUMENTS

| | | | |
|---|---|---|---|
| 2,337,619 A | 12/1943 | Miller | |
| 2,610,823 A | 9/1952 | Knowlton, Jr. | |
| 2,686,656 A | 8/1954 | Abild | |
| 2,914,300 A * | 11/1959 | Sayre | ............................ 415/135 |

(Continued)

FOREIGN PATENT DOCUMENTS

| | | |
|---|---|---|
| EP | 0513958 A2 | 11/1992 |
| EP | 0654586 A1 | 5/1995 |

(Continued)

OTHER PUBLICATIONS

Search Report and Written Opinion from corresponding PCT Application No. PCT/US12/68400, dated Feb. 4, 2013.

(Continued)

*Primary Examiner* — Igor Kershteyn
*Assistant Examiner* — Christopher R Legendre
(74) *Attorney, Agent, or Firm* — General Electric Company; William Scott Andes

(57) ABSTRACT

A quick engine change assembly, comprises a first circular frame member, a plurality of doublet supports spaced about the first circular frame member, the doublet supports being contoured along the axial direction, a flow surface defined between the plurality of doublet supports and, a plurality of cradles, each of the cradles including the doublet supports, the doublet supports from a lower portion of the cradle to the flow surface.

16 Claims, 11 Drawing Sheets

(56) References Cited

U.S. PATENT DOCUMENTS

| | | | |
|---|---|---|---|
| 4,256,435 A | 3/1981 | Eckel | |
| 4,500,255 A | 2/1985 | Webb | |
| 4,827,588 A | 5/1989 | Meyer | |
| 4,832,568 A * | 5/1989 | Roth et al. | 415/189 |
| 5,007,800 A | 4/1991 | Hacault et al. | |
| 5,222,360 A | 6/1993 | Antuna et al. | |
| 5,226,789 A * | 7/1993 | Donges | 415/189 |
| 5,272,869 A * | 12/1993 | Dawson et al. | 60/796 |
| 5,320,490 A * | 6/1994 | Corbin et al. | 415/209.3 |
| 5,399,069 A | 3/1995 | Marey et al. | |
| 5,522,705 A | 6/1996 | Elaini et al. | |
| 5,740,674 A | 4/1998 | Beutin et al. | |
| 5,765,993 A * | 6/1998 | Weiss | 415/209.2 |
| 6,592,326 B2 | 7/2003 | Marx et al. | |
| 6,821,087 B2 | 11/2004 | Matsumoto et al. | |
| 7,172,389 B2 * | 2/2007 | Hagle et al. | 415/209.2 |
| 7,300,253 B2 | 11/2007 | Beeck et al. | |
| 7,371,046 B2 | 5/2008 | Lee et al. | |
| 7,510,372 B2 | 3/2009 | Bogue et al. | |
| 7,527,757 B2 | 5/2009 | Chevin et al. | |
| 7,722,321 B2 * | 5/2010 | Lhoest et al. | 415/209.3 |
| 7,931,442 B1 | 4/2011 | Liang | |
| 7,980,817 B2 | 7/2011 | Foose et al. | |
| 8,459,942 B2 | 6/2013 | Sjunnesson et al. | |
| 8,672,623 B2 * | 3/2014 | Harper | 415/209.2 |
| 8,733,156 B2 | 5/2014 | Stilin et al. | |
| 8,734,101 B2 * | 5/2014 | McDonald et al. | 415/209.4 |
| 8,740,556 B2 * | 6/2014 | Papin et al. | 415/189 |
| 8,794,908 B2 | 8/2014 | Dezouche et al. | |
| 2007/0248780 A1 | 10/2007 | Schober et al. | |
| 2009/0014926 A1 | 1/2009 | Marini | |
| 2009/0238863 A1 | 9/2009 | Kojima et al. | |
| 2010/0284815 A1 | 11/2010 | Parker et al. | |
| 2012/0027604 A1 | 2/2012 | McDonald et al. | |
| 2012/0051923 A1 | 3/2012 | McDonald et al. | |
| 2012/0213633 A1 | 8/2012 | Samuelsson et al. | |
| 2012/0244003 A1 | 9/2012 | Mason | |
| 2012/0301312 A1 * | 11/2012 | Berczik et al. | 416/230 |
| 2013/0052004 A1 * | 2/2013 | Stilin | 415/211.2 |
| 2013/0149130 A1 * | 6/2013 | Hasting et al. | 415/208.1 |
| 2014/0044550 A1 | 2/2014 | Kern et al. | |
| 2014/0133975 A1 * | 5/2014 | Hasting et al. | 415/208.2 |
| 2014/0140832 A1 * | 5/2014 | Hasting et al. | 415/190 |

FOREIGN PATENT DOCUMENTS

| | | |
|---|---|---|
| EP | 1760266 A2 | 3/2007 |
| EP | 1972757 A1 | 9/2008 |
| EP | 1975373 A1 | 10/2008 |
| EP | 2233697 A2 | 9/2010 |
| EP | 2562361 A1 | 2/2013 |
| WO | 9115357 | 10/1991 |

OTHER PUBLICATIONS

Search Report and Written Opinion from corresponding PCT Application No. PCT/US12/68408, dated Jan. 31, 2013.
Search Report and Written Opinion from corresponding PCT Application No. PCT/US12/68424, dated Feb. 4, 2013.
Search Report and Written Opinion from corresponding PCT Application No. PCT/US12/68435, dated Feb. 4, 2013.
Unofficial English Translation of Japanese Office Action issued in connection with corresponding JP Application No. 2014546113 on Aug. 4, 2015.

* cited by examiner

QUICK ENGINE CHANGE ASSEMBLY FOR OUTLET GUIDE VANES

CROSS-REFERENCE TO RELATED APPLICATIONS

This nonprovisional application claims priority to and benefit under 35 U.S.C. §119(e) to U.S. Provisional Application Ser. No. 61/568,976, filed on Dec. 9, 2011, the entire contents of which are herein incorporated by reference.

BACKGROUND

The disclosed embodiments generally pertain to gas turbine engines. More particularly present embodiments relate to the structure of double fan outlet guide vanes and structural components of a quick engine change assembly including the double outlet guide vanes.

SUMMARY

An embodiment of the present invention provides a double outlet guide vane assembly for a gas turbine engine. The assembly has a first guide vane having a first end, a second end opposed to the first end, and a second guide vane having a first end, a second end opposed to its first end. A first end structure spans between the first guide vane first end and the second guide vane first end. A second end structure spans between the first guide vane second end and the second guide vane second end. The first guide vane, the second guide vane, the first end structure, and the second end structure are integrally formed together to form a double vane with a continuous outer surface, and a continuous inner surface.

An outlet guide vane assembly for a gas turbine engine comprises a first guide vane having a first end, a second end opposed to the first end, a second guide vane having a first end, a second end opposed to the first end, a first end structure spanning between the first guide vane first end and the second guide vane first end, and a second end structure spanning between the first guide vane second end and the second guide vane second end, wherein the first guide vane, the second guide vane, the first end structure, and the second end structure are integrally formed together to form a double vane having a first end and a second end opposed to the first end, and wherein the double vane has a continuous outer surface and a continuous inner surface.

A double outlet guide vane comprises a first curved guide vane and a second curved guide vane arranged in radially adjacent fashion, each of said first and second curved guide vanes having a pressure side, a suction side, a leading edge and a trailing edge, a first end structure spanning between the first guide vane and the second guide vane at a first end of the first and second guide vanes, a second end structure extending from the first vane toward said second vane at second ends of said first and second guide vanes, the first and second end structures joined at fillets to the first and second guide vanes, a flowpath defined between the first and second curved guide vanes and the first end and the second end, wherein a primary load path between a fan hub frame and forward engine mount is defined through the double outlet guide vane.

A doublet guide vane, comprises a first end structure having a radially inner surface and a radially outer surface, a second end structure spaced from the first end structure, the second end structure having a second radially inner surface and a second radially outer surface, a first guide vane having a first leading edge, a first trailing edge and first pressure and suction sides extending between the first leading and trailing edges, a second guide vane having a second leading edge, a second trailing edge and second pressure and suction sides extending between the second leading and trailing edges, the first and second end structures joining the first and second guide vanes at fillets, the doublet guide vane being capable of carrying a load between the forward engine core and the forward engine mount.

A quick engine change assembly, comprises a first circular frame member, a plurality of doublet supports spaced about the first circular frame member, the doublet supports being contoured along the axial direction, a flow surface defined between the plurality of doublet supports and, a plurality of cradles, each of the cradles including the doublet supports, the doublet supports from a lower portion of the cradle to the flow surface.

A quick engine change assembly, comprises a continuous circular frame having a first ring and a second ring, a cradle formed axially between the first ring and the second ring, the cradle having a radially inner portion and fillets extending radially outward from the radially inner portion, the fillets rising toward a flow path surface disposed adjacent the cradle.

A quick engine change assembly comprises a circular frame formed of at least one circular ring, cradles extending in an axial direction for receiving a fan double outlet guide vane, the cradles including a plurality of supports for the fan double outlet guide vane, a flow surface disposed between adjacent cradles and extending in an axial direction, fastener apertures extending through the circular frame in an axial direction capable of connection to a fan hub frame.

A fan hub frame comprises a circular hub having an opening extending axially wherein an engine core is capable of being positioned, the circular hub having a radially outer surface, the radial outer surface having a plurality of cradles, each of the cradles having a lower surface and fillets disposed between the lower surface and upwardly extending sidewalls, the cradles capable of receiving a double outlet guide vane.

A fan hub frame comprises a circular hub having a radially outer surface and a radially inner opening wherein a propulsor may be positioned, a plurality of cradles circumferentially spaced along the radially outer surface of the circular hub, each of the plurality of cradles defined by fillets capable of receiving a double outlet guide vane, a plurality of fastener apertures extending in a radial direction through the cradles.

A structural platform comprises a first end, a second end, a first side wall and a second side wall, a platform body extending between the first end and the second end and further between the first side wall and the second side wall, a first fillet joining the first side wall and the platform body, a second fillet joining the second side wall and the platform body, the sidewalls being curved.

The structural platform, comprises a first side wall extending between a first end and a second end, a second side wall extending between a first end and a second end, a platform body extending between the first side wall and the second side wall, and from the first end to the second end, a fillet disposed between each of the first sidewall and the second side wall, the first side wall and the second side wall curved between the first end and the second end, the curvature approximating a curvature of an airfoil surface.

BRIEF DESCRIPTION OF THE ILLUSTRATIONS

Embodiments of the invention are illustrated in the following illustrations.

DETAILED DESCRIPTION

Figure 1:
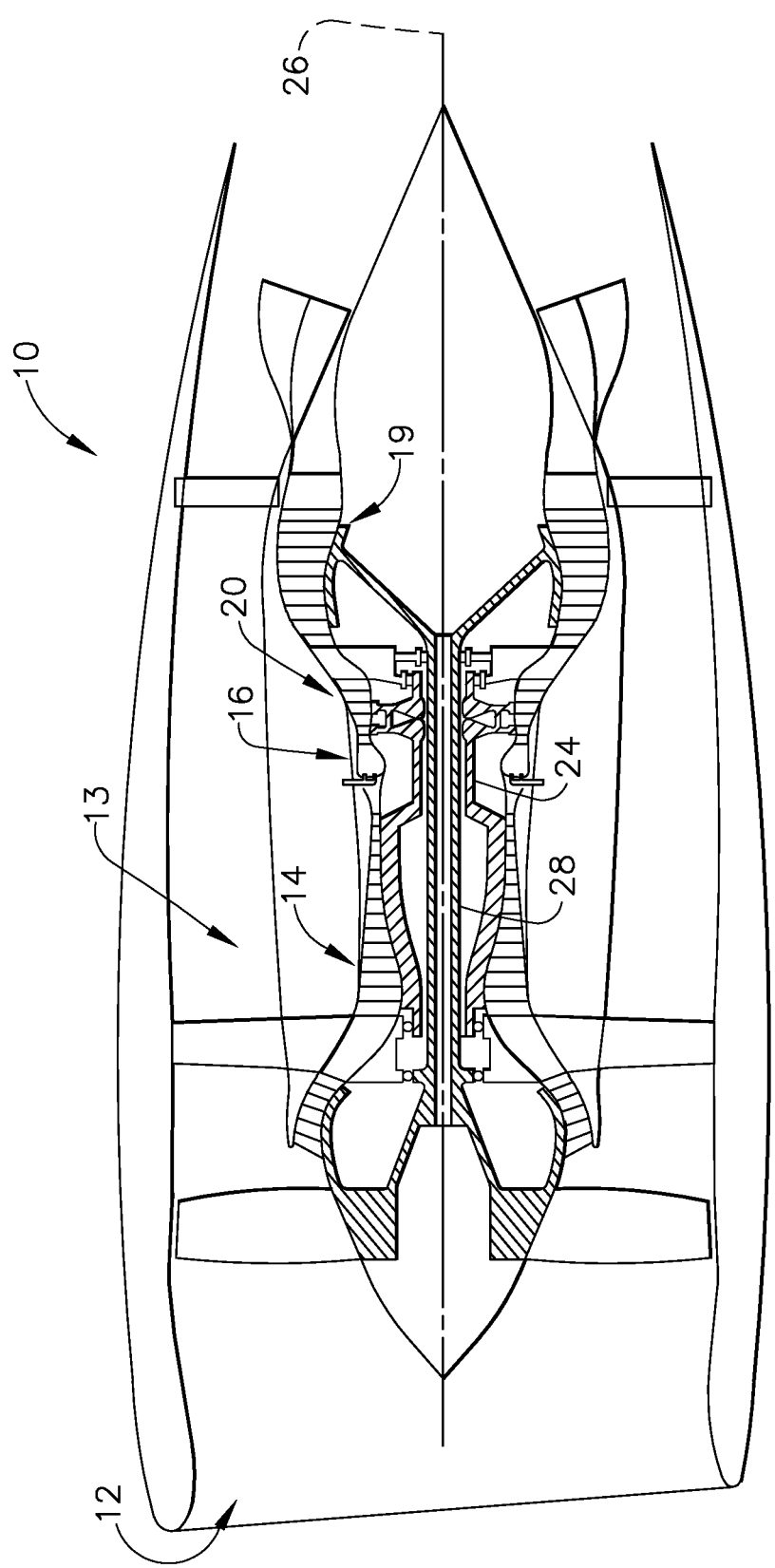
FIG. 1 is a side section view of an exemplary turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-14, various embodiments of a gas turbine engine 10 are depicted having a double outlet guide vane with structural platforms. These structures may, but are not required to, be utilized with a quick engine change assembly which allows rapid removal of a propulsor. The double outlet guide vanes may be formed of lightweight materials while still providing a loadpath for the engine to the engine mount. Various improvements are described herein.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Referring initially to FIG. 1, a schematic side section view of a gas turbine engine 10 is shown having an engine inlet end 12 wherein air enters the propulsor 13 which is defined generally by a compressor 14, a combustor 16 and a multi-stage high pressure turbine 20. Collectively, the propulsor 13 provides thrust or power during operation. The gas turbine 10 may be used for aviation, power generation, industrial, marine or the like. Depending on the usage, the engine inlet end 12 may alternatively contain multi-stage compressors rather than a fan. The gas turbine 10 is axis-symmetrical about engine axis 26 or shaft 24 so that various engine components rotate thereabout. In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design.

The axis-symmetrical shaft 24 extends through the turbine engine 10, from the forward end to an aft end. The shaft 24 is supported by bearings along its length. The shaft 24 may be hollow to allow rotation of a low pressure turbine shaft 28 therein. Both shafts 24, 28 may rotate about the centerline axis 26 of the engine. During operation the shafts 24, 28 rotate along with other structures connected to the shafts such as the rotor assemblies of the turbine 20 and compressor 14 in order to create power or thrust depending on the area of use, for example power, industrial or aviation.

Referring still to FIG. 1, the inlet 12 includes a turbofan 18 which has a plurality of blades. The turbofan 18 is connected by the shaft 28 to the low pressure turbine 19 and creates thrust for the turbine engine 10. The low pressure air may be used to aid in cooling components of the engine as well.

A typical gas turbine engine generally possesses a forward end and an aft end with its several components following inline therebetween. An air inlet or intake is at a forward end of the engine. Moving toward the aft end, in order, the intake is followed by a compressor, a combustion chamber, a turbine, and a nozzle at the aft end of the engine. It will be readily apparent from those skilled in the art that additional components may also be included in the engine, such as, for example, low-pressure and high-pressure compressors, high-pressure and low-pressure turbines, and an external shaft. This, however, is not an exhaustive list. An engine also typically has an internal shaft axially disposed through a center longitudinal axis of the engine. The internal shaft is connected to both the turbine and the air compressor, such that the turbine provides a rotational input to the air compressor to drive the compressor blades. A typical gas turbine engine may also be considered to have an outer circumference with a central longitudinal axis therethrough.

Figure 2:
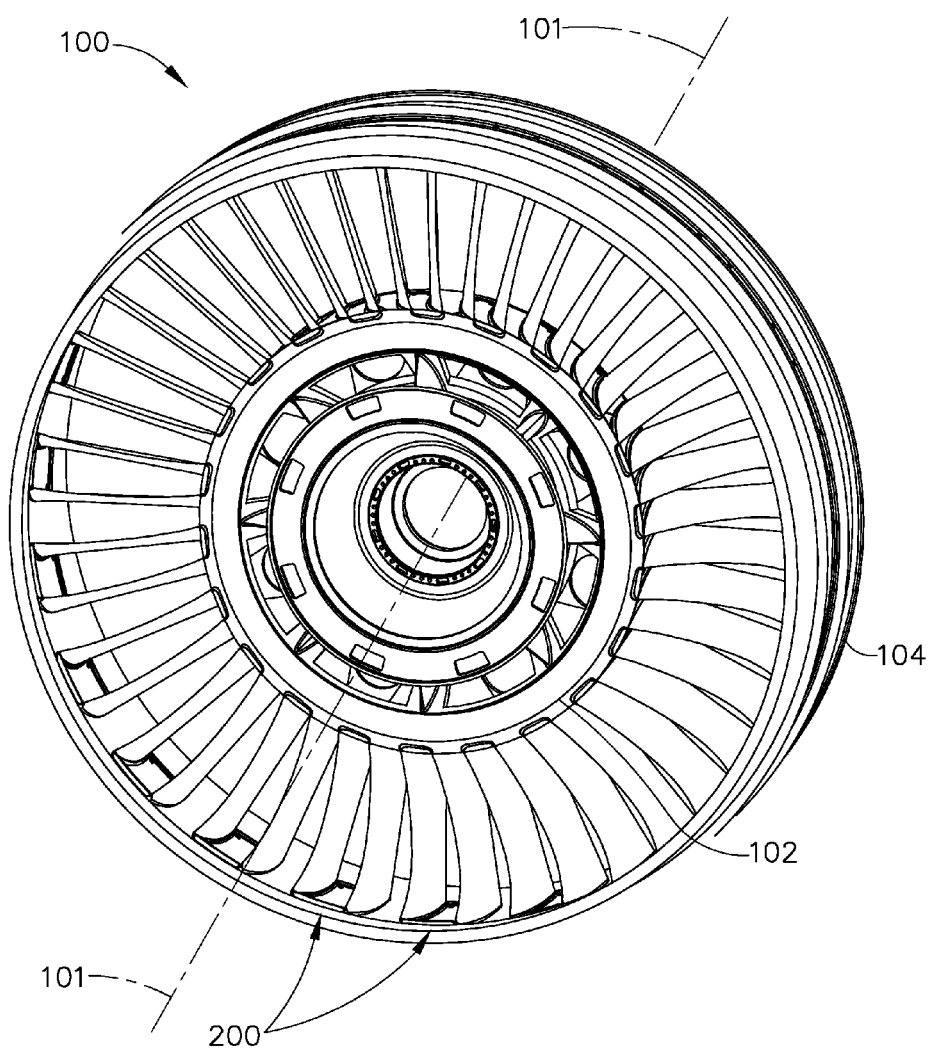
FIG. 2 is a perspective view of a fan hub frame assembly.

Referring to FIG. 2, a perspective view of a fan frame assembly 100 is shown. The fan frame assembly 100 is generally provided with a first circular frame member or fan hub frame 102, a second circular frame member or fan case 104, and a plurality double outlet ("doublet") guide vanes 200 disposed in a radial array about the hub frame 102 and fan case 104. The assembly 100 has a central longitudinal axis 101 disposed therethrough that is generally the longitudinal axis 26 of a gas turbine engine (FIG. 1) with which the assembly 100 would be associated. The fan hub frame 102 may also be known by other names such as an intermediate compressor case. The doublet guide vanes 200 provide the load path from the fan hub frame (and thereby the propulsor 13) to the forward engine mount (not shown).

Figure 3:
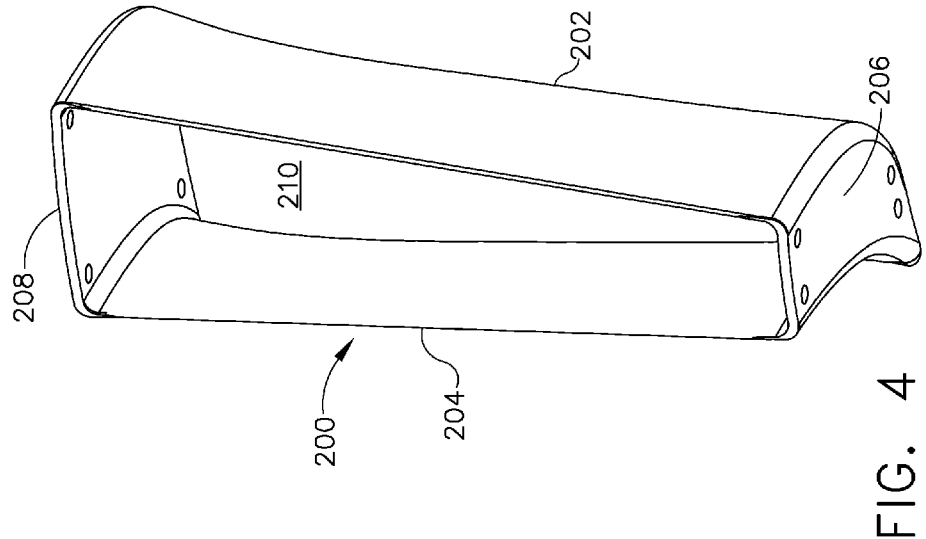
FIG. 3 is a perspective view of a double outlet guide vane detailing the inner features of a radially inward end of the double outlet guide vane and the outer features of a radially outward end of the double outlet guide vane.
Figure 4:
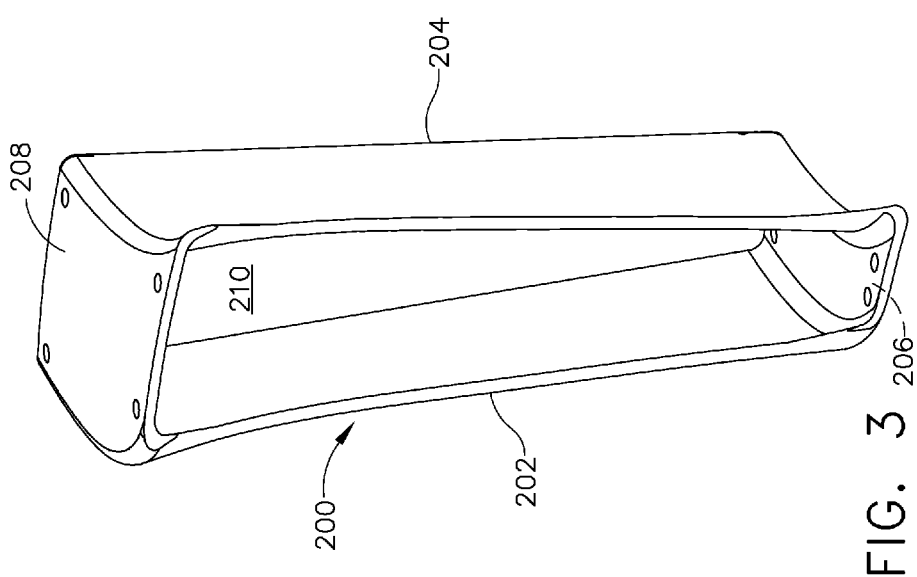
FIG. 4 is a perspective view of the double outlet guide vane detailing the inner features of a radially outward end of the double outlet guide vane and the outer features of the radially inward end of a double outlet guide vane.

Referring to FIGS. 3 and 4, opposing perspective views of a double outlet guide vane 200 are provided. The double vane 200 is provided with a first guide vane 202, and a second guide vane 204. A first end structure 206 spans between a radially inward first end of the first guide vane 202 and a radially inward first end of the second guide vane 204. A second end structure 208 spans between a radially outward second end of the first guide vane 202 and a radially outward second end of the second guide vane 204. The first guide vane 202, the second guide vane 204, the first end structure 206, and the second end structure 208 are integrally formed together to form a double vane 200 with a substantially continuous outer surface, and a substantially continuous inner surface. A flow path 210 for a fluidized flow is provided therethrough.

The double outlet guide vane 200 may be manufactured of a variety of materials, such as, for example, composite materials, or metals. One such material may be a fiber composite, such as a carbon fiber composite laminate. The doublet vane 200 may be manufactured in a way that the fibers are continuously and uninterruptedly wound around the doublet vane 200. The method to manufacture such a structure may be accomplished by, for example, resin transfer molding with dry fiber, automated fiber placement, or a hand layup process with pre-impregnated fiber. The doublet vane 200 may also be manufactured from metal, such as, for example, aluminum alloys, titanium alloys, and other known alloys suitable for use in a gas turbine engine.

Figures 5, 6:
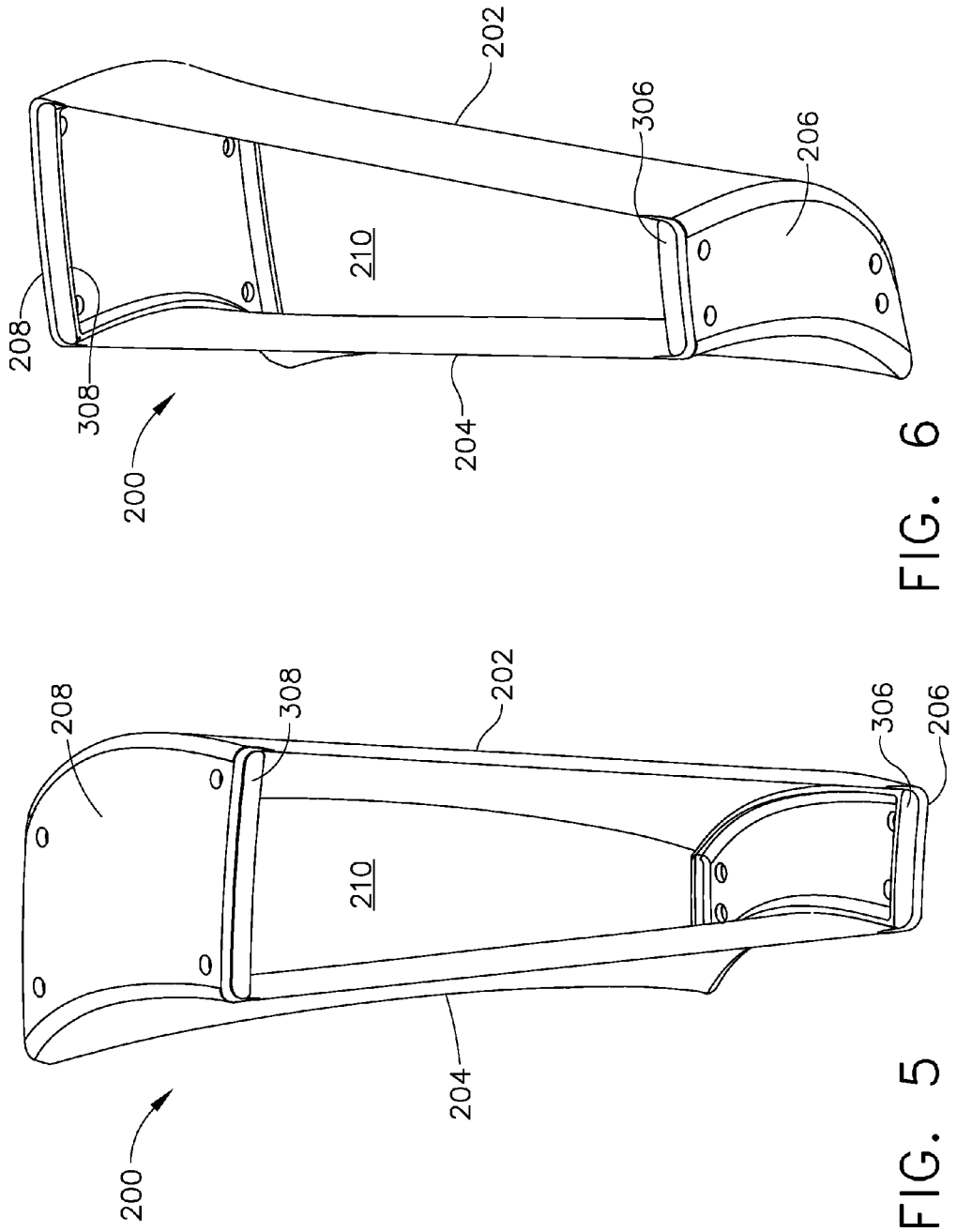
FIG. 5 is a perspective view of a double outlet guide vane detailing the inner features of a radially inward end of a double outlet guide vane and the outer features of a radially outward end of a double outlet guide vane, with both ends having a structural platform therein.
FIG. 6 is a perspective view of a double outlet guide vane detailing the inner features of a radially outward end of the double outlet guide vane and the outer features of a radially inward end of the double outlet guide vane, with both ends having a structural platform therein.

Referring now to FIGS. 5 and 6, a double outlet vane 200 is shown in perspective view with first and second structural platforms 306, 308 abutting an inner surface of the first and second end structures 206, 208. The first and second structural platforms 306, 308 have a surface that faces the inner surface of the first and second end structures 206, 208 and generally matches the geometry and contours of the inner surface of the first and second end structures 206, 208. The structural platforms 306, 308 are utilized to spread loads experienced by the double vanes 200 to the surrounding hardware to which they are attached, such as the fan hub frame 102 and the fan case 104.

Figures 7, 8:
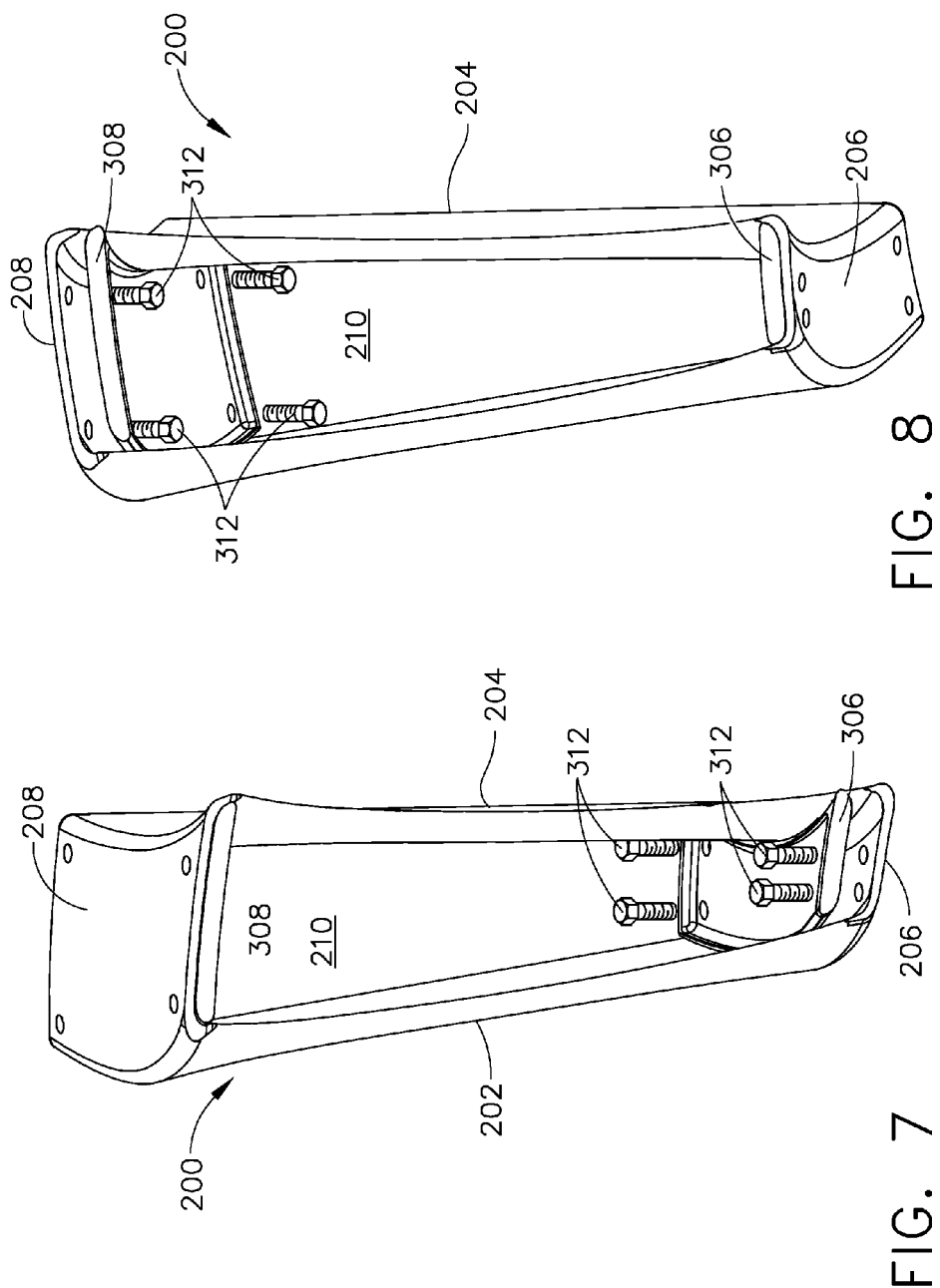
FIG. 7 is an exploded assembly illustration of the embodiments shown in FIGS. 5 and 6.
FIG. 8 is an exploded assembly illustration of the embodiments shown in FIGS. 5 and 6.

Referring now to FIG. 7, an exploded assembly view of an inner surface of a double vane first end structure 206 and a first structural platform 306 is provided. FIG. 8 is an exploded assembly view of an assembly of an inner surface of a double vane second end structure 208 and a second structural platform 308. When assembled to the fan hub frame 102 and the fan case 104, the first end structure 206 is disposed between the first structural platform 306 and the fan hub frame 102 (see FIG. 9). Likewise, the second end structure 208 is disposed between the second structural platform 308 and the fan case 104 (See FIG. 10). The first and second end structures and their respective structural platforms may be the fan case assembly by fasteners 312 or by any known bonding methods. The first and second end structures and their respective structural platforms may be mounted to one another by any known bonding methods. The platforms 306, 308 provide rigidity and stability for the doublets 200 while allowing the doublet 200 to be formed of lightweight materials.

Figure 9:
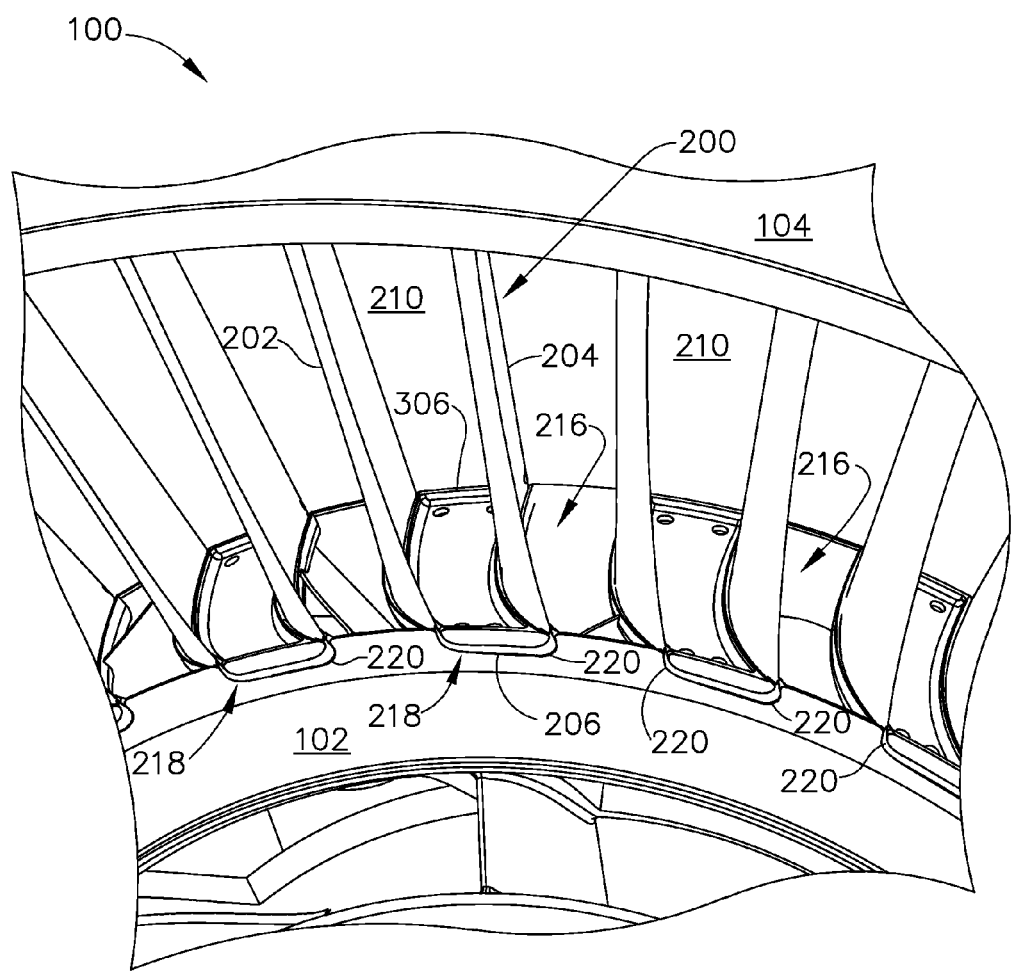
FIG. 9 is a perspective illustration of a radially inward end of a double outlet guide vane and a structural platform therein assembled to a fan hub frame.
Figure 10:
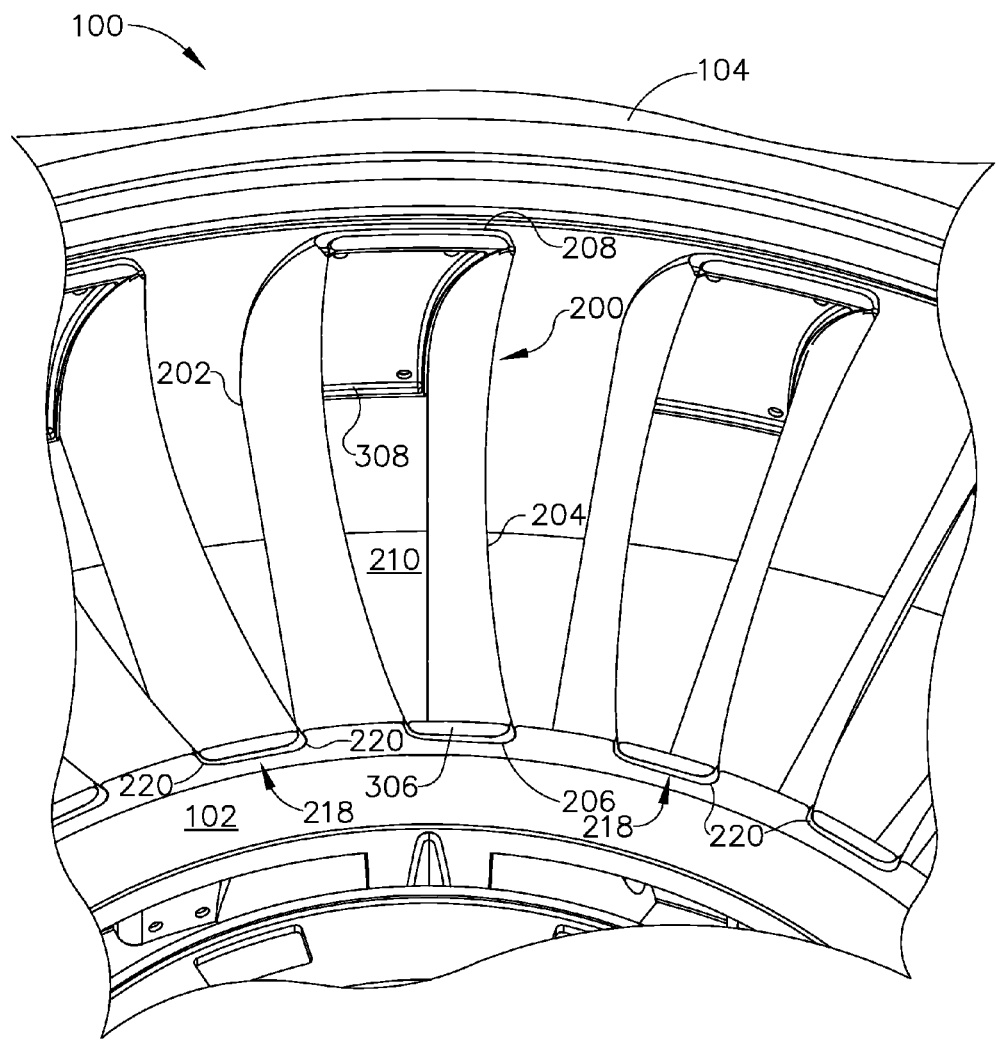
FIG. 10 is a perspective illustration of a radially outward end of a double vane and a structural platform therein assembled to a fan case or aft fan case.

Referring now to FIGS. 9 and 10, perspective views of the assembly 100 are shown. The plurality of double vanes 200 are provided assembled to a fan hub frame 102 and a fan case 104. In FIG. 9, the first end structure 206 is mounted to a radially outer surface of the fan hub frame 102. The radially outer surface 216 of the fan hub frame 102 may be provided with a cradle-like structure 218 that conforms to match the geometry and contours of the outer surface of the first end structure 206. The cradles 218 include fillets 220 which form supports, along with the sidewall of the cradle 218 for the double vane outlets 200. In FIG. 10, the second end structure 208 is mounted to a radially inner surface of the fan case 104. The radially inner surface of the fan case 104 is shown without a cradle-like structure. However, a cradle-like structure may be utilized. Still, the inner surface of the fan case 104 conforms to the outer surface of the second end structure 208. In both configurations, the first and second end structures 206, 208 are disposed between the first and second structural platforms 306, 308 and the fan hub frame 102 and fan case 104, respectively. As shown, the hub frame 102 is provided with cradle-like structures, and the fan case 104 is not. However, either of the hub frame 102 or the fan case 104 may be provided with or without a cradle-like structure in any combination.

Figure 11:
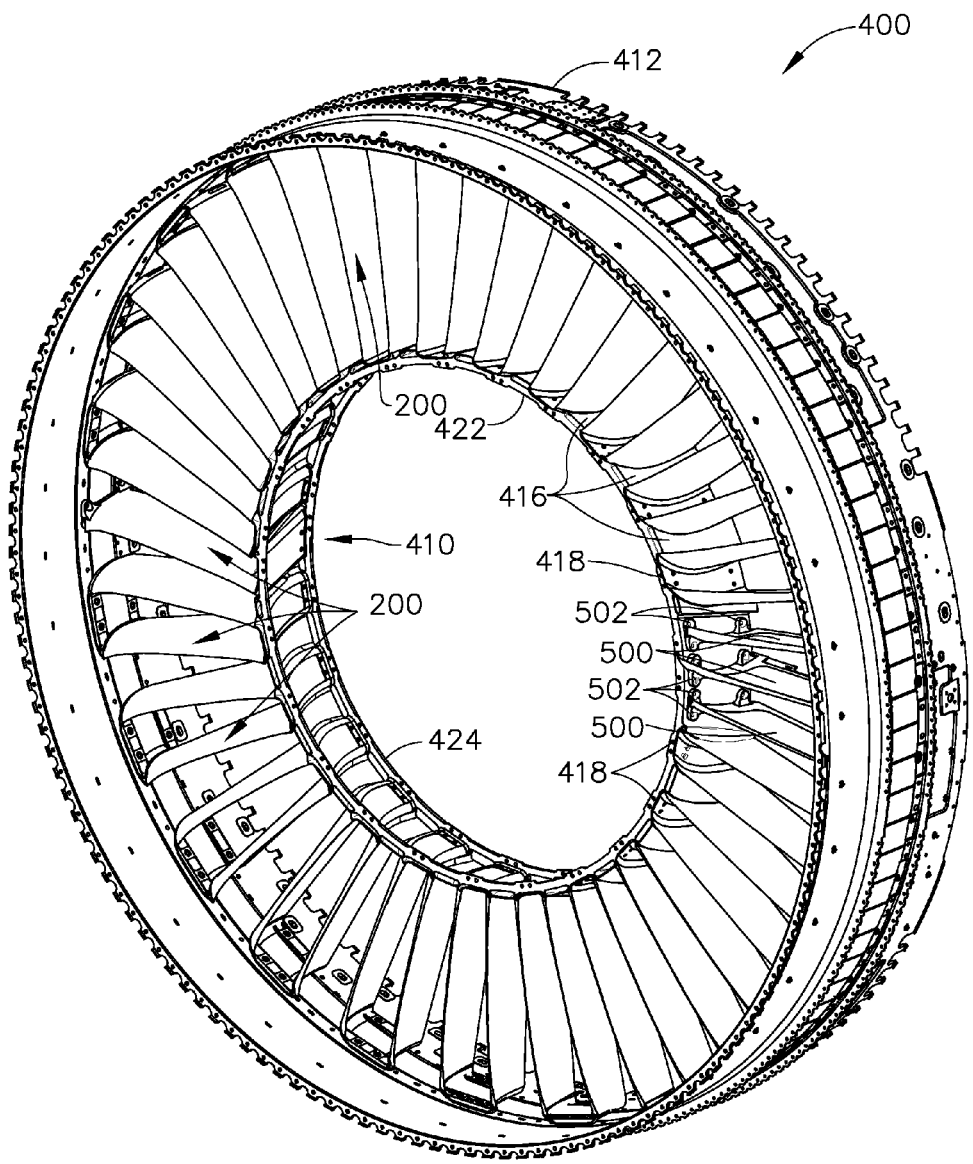
FIG. 11 is a perspective view of an aft fan case assembly.

Referring now to FIG. 11, a perspective view of an aft fan case assembly 400 is depicted. According to previous embodiments, the double outlet or doublet guide vanes 200 were positioned in a fan hub frame 102 (FIG. 2). However, the present embodiment provides that the doublet guide vanes 200 are disposed in a quick engine change configuration. As with the previous embodiment, the instant embodiment provides a primary loadpath through the aft fan case assembly 400 and the double outlet guide vanes 200. The aft fan casing assembly 400 includes a first circular frame 410 at an inner radius and a second circular frame 412 at an outer radius wherein the doublet guide vanes 200 are disposed therebetween. According to some embodiments, first circular frame 410 is a quick engine change ring and the second circular frame 412 is a fan case, such as an aft fan case, for example. The quick engine change ring allows for easy separation, generally shown in FIG. 14, of the doublet vane assembly from the propulsor components 13 which are generally in need of more frequent maintenance. The propulsor components 13 may be worked on for scheduled or unscheduled maintenance. Meanwhile a second propulsor may be installed in the quick engine change ring [410] so that the engine can be returned to service sooner, if desired.

The quick engine change ring includes a first ring 422 and a second ring 424. The rings 422, 424 are spaced axially in the direction of the engine axis 26 and may each be formed of one piece continuous or multiple pieces connected together. Extending in an axial direction between the first ring 422 and the second ring 424 are a plurality of flow surfaces 416. The flowpath surfaces 416 improve air movement across the rings 422, 424 while allowing the weight saving design of the two rings rather than a solid or other otherwise heavier structure. Extending in the axial direction between the first and second rings 422, 424 and further between the flow surfaces 416 are cradles 418. Each of the cradles 418 includes a curved portion where the lowermost portion of the cradle curves up toward the flow surface 416. A stationary doublet guide vane 200 is positioned within each of the cradles 418 in order to turn an airflow in a desirable manner through portions of a gas turbine engine 10. Flowpaths are created between each of the vanes 202,204 and between the cradles 418. According to this embodiment, the propulsor 13 may be quickly disconnected for ease of removal and replacement allowing continued service of the engine.

Figure 12:
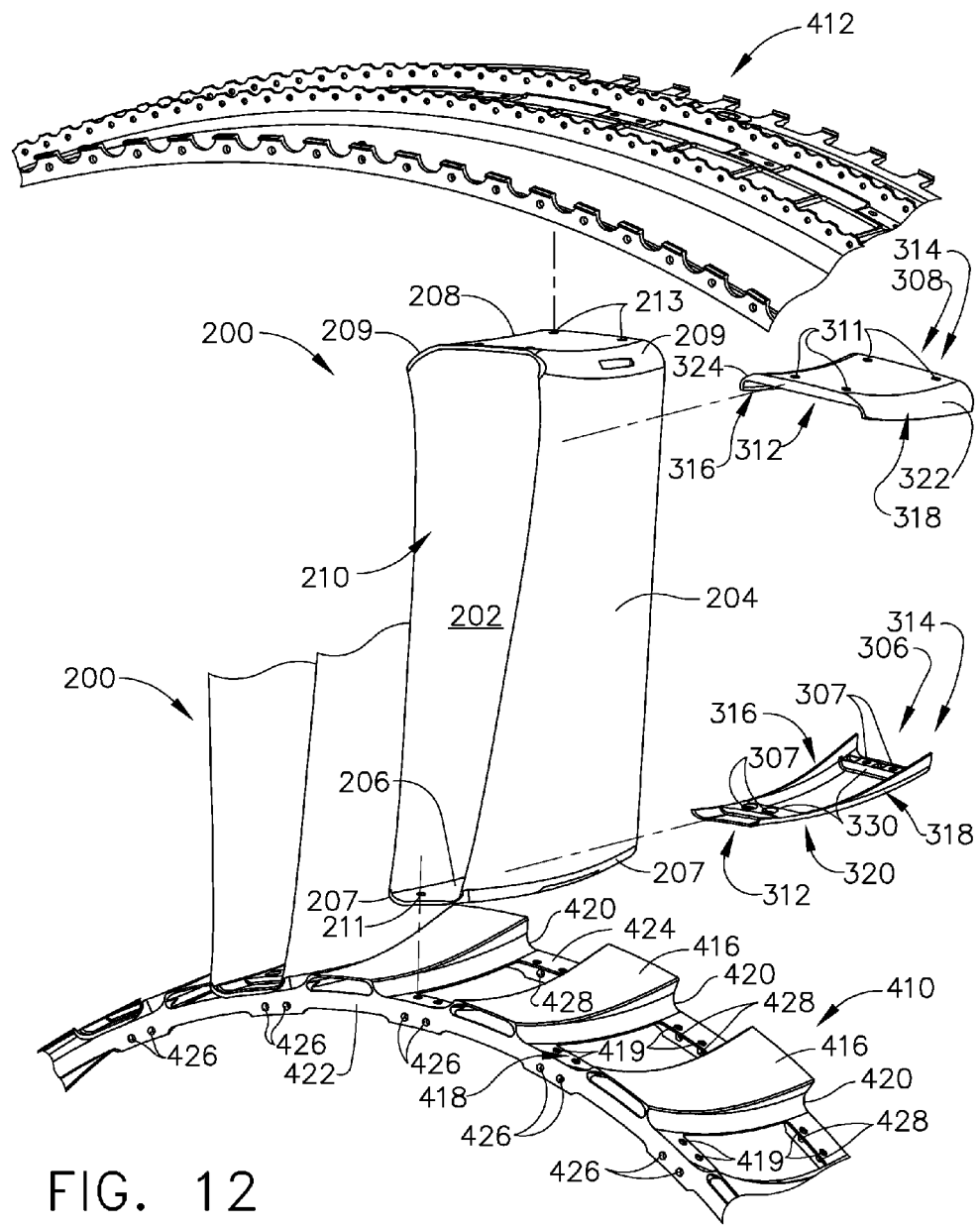
FIG. 12 is a partially exploded view of the aft fan case assembly of FIG. 11.

Referring now to FIG. 12, an exploded perspective view of a portion of the aft fan case assembly 400 is shown. The quick engine change ring [410] is shown at the bottom of the figure. Extending between the first ring 422 and the second ring 424 are flow surfaces 416. These provide a flow or control surface along which air can move as it passes between the doublet guide vanes 200. The flow surface 416 depicted is curved between the forward ring 422 and the rear ring 424. The flow surface may also be curved in the circumferential direction. The flow surface 416 may alternatively be linear between the first and second rings 422, 424 and/or the circumferential direction. The quick engine change ring [410] includes the cradles 418 between the flow surfaces 416. The cradles 418 receive the radially inner ends of the doublet guide vanes 200 and have curved surfaces 420 which transition between the cradles 418 and flow surfaces 416. Within the cradles 418 along the first ring 422 and second ring 424 are fastener apertures 419 which extend through the rings or hoops in a generally axial direction relative to the engine. The apertures 419 are used to connect the doublet guide vanes 200 to the quick engine change ring. The first and second rings also include apertures 426, 428 respectively allowing quick disconnect of the aft fan case assembly 400 from the propulsor 13, as will be discussed further herein.

Beneath the doublet guide vane 200 is the cradle 418 which provides a seating location for the doublet vane 200. The cradle 418 has a U-shaped cross-section which curves moving in the axial direction from the first ring 422 to the second ring 424. The cradles 418 extend up the sides of the vane 200 to support the lower ends of the guide vanes 202, 204. The height at which the flowpath surfaces 416 are disposed and curved portions 420 causes cradling of the doublet vane 200. This cradling provides additional support and limits flexing of the doublet vane 200 during operation. The cradle 418 further comprises curved surfaces or fillets to improve rigidity of the circular frame 310 and improve manufacturability.

The outer ring or fan case 412 is also exploded to depict the radially outer ends of the doublet vanes 200. The fan case 412 receives fasteners which extend through an upper surface 208 of the doublet guide vane 200 and through the fan case 412. Each doublet vane 200 is connected to the fan case assembly 400 by sandwiching the doublet guide vane 200 between platform 308 and the fan case 412.

Also shown within the assembly 400 are structural platforms 306, 308. At the radially inner end of the doublet guide vane 200 is an inner structural platform 306 which sandwiches the first or inner end 206 of the vane 200. The structural platform 306 has a lower surface which curves near lateral sides to match the curvature of 207 the first end 206. The platform 306 is positioned above the lower portion 206 of the doublet vane 200 which is above the circular quick engine change ring. According to the embodiment depicted, the platform 306 has first and second bolt apertures 307 which are aligned with apertures 211 in the lower end 206 of the doublet vane 200. The platform 306 and vane 200 are then bolted to the quick engine change ring through apertures 419 in the first ring 422 and the second ring 424. This sandwiches or captures the lower end 206 of vane 200 in the cradle 418 of the quick engine change ring. Such construction provides various improvements over prior art designs. First the composite guide vane 200 is sandwiched between a structural platform and the quick engine change ring. This provides a significant increase in stiffness. Additionally, the construction does not require any adhesive bonds which may deteriorate due to the high operating temperature of the gas turbine engine. The design also provides that there are no composite to metal transitions or integrations. Finally, the design provides greater aeromechanical margins and greater damping during operation.

Similarly, at the upper or radially outer end 208 of the guide vane 200 is the structural platform 308 which sandwiches the upper end 208 between the platform 308 and the fan case 412. Lateral ends of the platform 308 are curved to fit against the curved ends 209 of the platforms 200, providing structural support in at least the lateral or circumferential directions.

Each of the lower and upper end structures 206, 208 has a radially inner and radially outer surface. Each of the structures 206, 208 may be formed integrally with the vanes 202, 204 or may be formed of one or more pieces which are joined with the vanes 202, 204 to form the doublet guide vane 200.

Referring still to FIG. 12, structural platforms 306, 308 are shown. The platforms 306, 308 comprise a first end 312, a second end 314, a first side wall 316 and a second side wall 318. A platform body 320 extends between the first end 312 and the second end 314 between the first side wall 316 and said second side wall 318. A first fillet 322 joins the first side wall 316 and the platform body 320. Similarly, a second fillet 324 joins the second side wall 318 and the platform body 320. The sidewalls 316, 318 are curved to correspond to the curvature of the vanes 202, 204. The structural platform sandwiches a doublet guide vane 200 within a cradle 418. The platform body 320 may further comprise a skin facing an airflow and having a smooth surface. This may be formed of composite of metal and bonded to the platforms 306, 308. The structural platforms 306, 308 may be formed of one of metal, plastic or composite. The structural platforms may have first side wall and second side walls which extend in a radial direction. The first side wall 316 and the second side wall 318 may be curved to approximate a mating airfoil surface. The platform body having a plurality of apertures 307, 311 for receiving fasteners. Additionally, the structural platform may further comprise structural stiffeners (330) extending between said first and second side walls.

Means may be utilized to make connection between the exemplary embodiments of the platforms 306, 308 to the guide vanes 200 and ring [410] and case 412. According to exemplary embodiments, fasteners are utilized through apertures 307 and 311. Additionally, while the inner surface of platform 306 is shown as uneven or non-smooth, an insert, skin or cover may be used to provide a smooth surface for improved airflow through the guide vane 200. This skin or cover may be used to also cover bolt holes sandwiching the platforms 306, 308, the doublet vanes 200 and first and second circular frame members 102, 104 and 410, 412.

The aft fan case assembly 400 utilizes a circular frame member 410 formed according to one example of a first continuous ring 422 and a second continuous ring 424 which are positioned parallel to one another in an axial direction. The assembly 400 further comprises flow surfaces 416 which extend from the first ring 422 to the second ring 424 and between the doublet vanes 200. The flow surfaces 416 are raised from the first and second continuous rings 422, 424. As a result, the cradles 418 between the flow surfaces 416 are formed wherein the doublet vanes 200 maybe positioned.

Referring still to FIG. 12, the doublet guide vanes 200 are shown. As previously described, the guide vanes 200 include first and second vanes 202, 204 which extend from a leading edge to a trailing edge in a chord-wise direction. Each guide vane has a pressure side and a suction side. The vanes 202, 204 are shorter at the outer diameter than the inner diameter. Additionally, the doublet guide vanes are wider in a circumferential direction at the upper end 208 than the inner end 206. At the first, radially inner end 206, the guide vanes 202, 204 are joined to provide a rigid lower end. Each vanes 202, 204 are arranged in circumferentially adjacent fashion, two per guide vane 200 according to one exemplary embodiment. Other arrangements may be utilized. The radially inner end structure 206 joins the guide vanes 202, 204 at the radially inner end to provide rigidity. Similarly, at the opposed radially outer end 208 the guide vanes 202, 204 are joined to provide a closed structure. At the upper end 208, the guide vanes 202, 204 curve 209 to join the upper end 208 similar to the curved or radius 207 at the lower end 206. The radiuses 207, 209 are received in correspondingly curved doublet supports 420 of the cradle 418 and the fan case 412. These curved areas provide strength and support for the doublet guide vanes 200 and the structural platforms 306, 308 provide further support. The doublet guide vanes 200 may be formed of metal, or composite material.

Referring again briefly to FIG. 11, the assembly 400 includes a plurality of single vanes 500, as opposed to the doublet guide vanes 200. The single vanes 500 are generally formed of metal and are of higher strength than the double guide vanes 200. The single guide vanes 500 are utilized to carry higher loads through to the engine mounts for the gas turbine engine. The vanes 500 include feet 502 which connect the vane 500 to the inner rings 422 and 424. According to the exemplary embodiment, there are four feet 502 at the radially inner end of the vane 500, two feet axially forward and two feet axially rearward. The radially inner feet may be connected to, for example, the fan hub frame 102, or may be connected to a quick engine change assembly described further herein. At the outer end of the vanes 500 there are also four feet 502 (not shown) which connect the vane to the radially outer structure, for example the fan case 104, 412.

Figure 13:
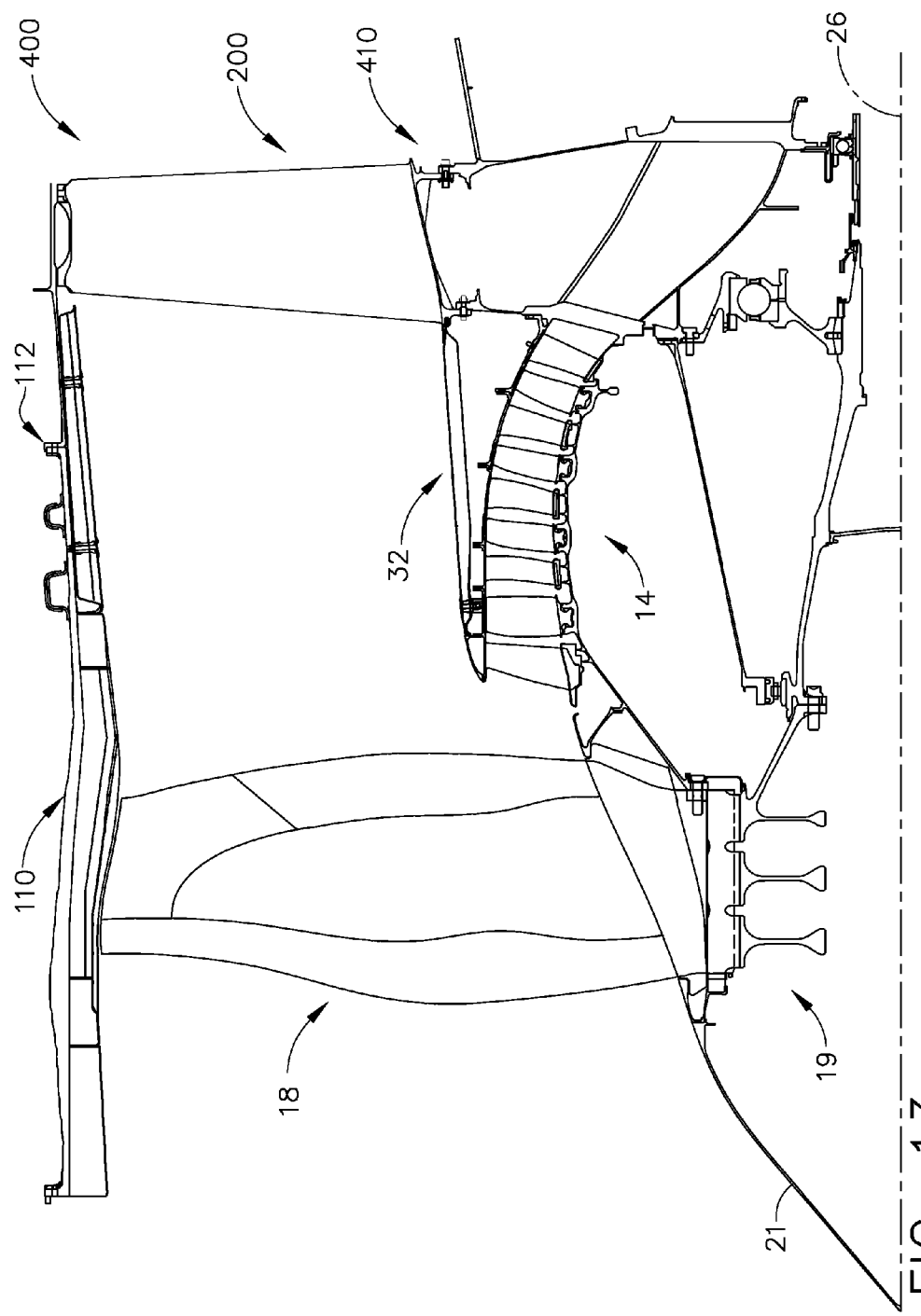
FIG. 13 is a side section view of a forward portion of a gas turbine engine.

Referring now to FIG. 13, a side section view of a portion of a gas turbine engine 10 is depicted. Specifically forward aft case assembly 110 is shown and the aft fan case assembly 200 is shown joined at a lug or flange connection 112.

The forward fan case assembly 110 includes the fan 18 secured to a disc 19 and axially rearward of a spinner or cone 21. The fan 18 and disc 19 rotate about the engine axis 26. Aft of the fan 18 is a compressor 14 which is a part of the propulsor 13, generally referring to all of the core components of the engine causing propulsion such as the turbine, shafts, compressor 14 which extend from the forward fan case assembly 110, through the aft fan case assembly 200 and aft to define the gas turbine engine 10. A booster panel 32 extends axially above the compressor 14 and connects to the quick engine change ring [410]. The booster panel 32 limits air flow in the compressor 14 from mixing with air moving through the guide vanes 200. The guide vanes 200 extend between the quick engine change ring [410] and the aft fan case 412.

As previously stated, the quick engine change embodiment provides for easy change engine components, specifically propulsors, which generally have fail parts and wear parts with higher maintenance requirements.

Figure 14:
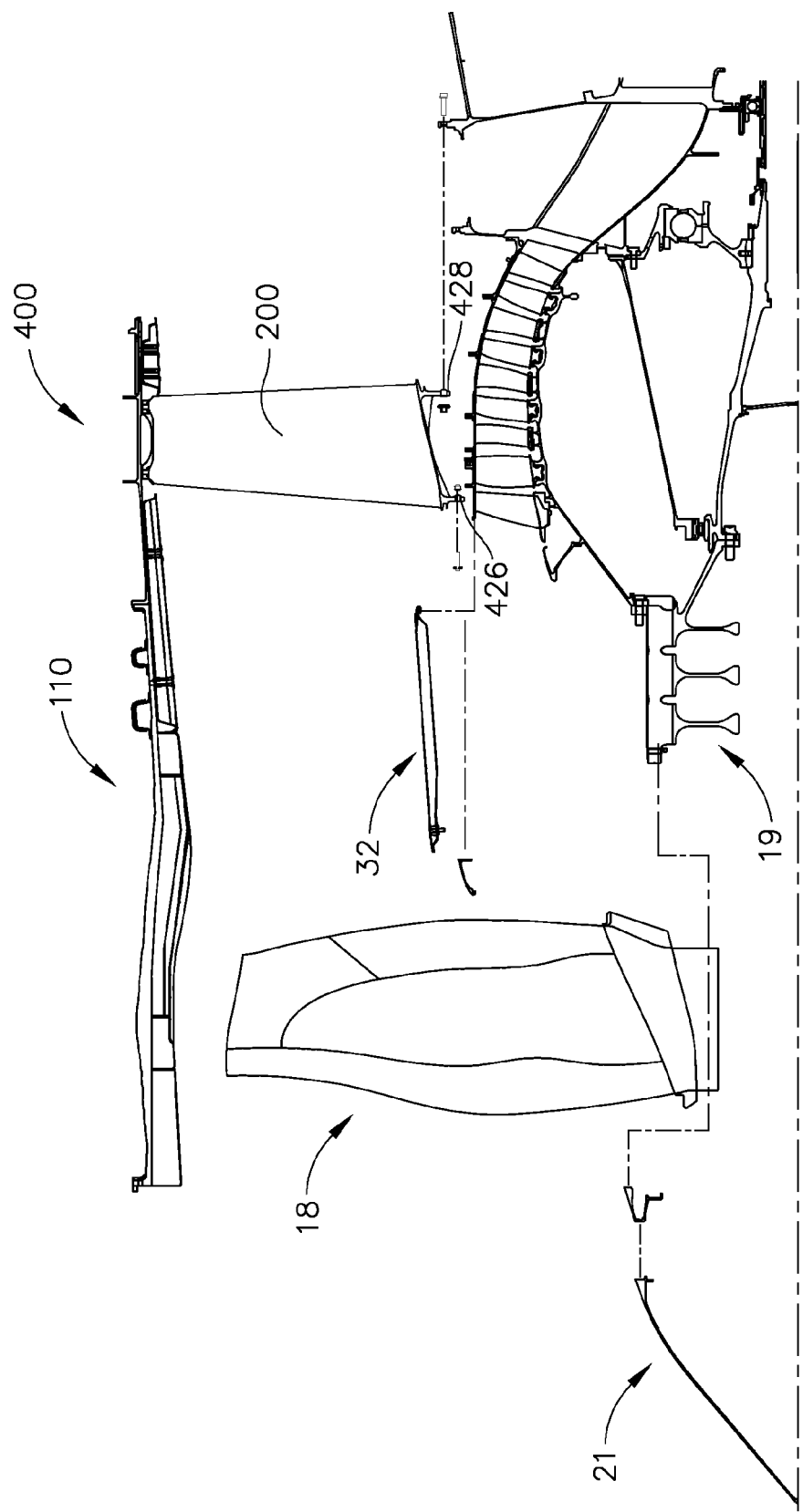
FIG. 14 is a partially exploded side section view of the forward engine portion shown in FIG. 13.

With reference now to FIG. 14, the internal components of the of the engine propulsor 13 are disconnected from the aft fan case assembly 400. This allows the quick change of either the fan case assembly 400 or the propulsor components 13. Specifically, the spinner or cone 21 is removed from the forward end of the engine at the engine intake area. Next, the fan blades 18 are removed and pulled axially forward from the engine. The booster panels 32 are removed after the fan blades 18.

With these parts removed, the axial forward and rearward bolts are removed from the quick engine change ring. The axially forward fastener apertures 426 and axially rearward apertures 428 are best shown in FIG. 12. These apertures 426, 428 are used to connect the radially inner propulsor 13 to the radially outer quick engine change ring and the outward components of the aft fan case assembly 400. With these bolts removed from aperture 426, 428, the propulsor 13 can be removed in an axially rearward direction from the aft fan case assembly 400.

Various means may be utilized to make connection between the exemplary embodiments of the platforms 306, 308 to the guide vanes 200 and ring and case 412. According to exemplary embodiments, fasteners are utilized through apertures 307 and 311. Additionally, while the inner surface of platform 306 is shown as uneven or non-smooth, an insert or cover may be used to provide a smooth surface for improved airflow through the guide vane 200.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain forms of an outlet guide vane with structural platforms have been illustrated and described, it is not limited thereto and instead will only be limited by the claims, appended hereto.

What is claimed is:

1. A quick engine change assembly, comprising:
   a first circular frame member;
   fillets extending radially outward from radially outer portions of said first circular frame member; and
   a plurality of doublet supports delimited by said fillets and spaced about said first circular frame member, said doublet supports being contoured along the axial direction;
   a flow surface defined between said plurality of doublet supports; and,
   a plurality of cradles, each of said cradles including said doublet supports;
   said doublet supports extending from a lower portion of said cradle to said flow surface; and
   further comprising a platform bolted through a doublet at said cradle.

2. The quick engine change assembly of claim 1, said first circular frame member further comprising a first ring and a second ring which define a quick engine change ring.

3. The quick engine change assembly of claim 2 wherein said first ring and said second ring are continuous.

4. The quick engine change assembly of claim 1 wherein a second circular frame member is a fan case.

5. The quick engine change assembly of claim 4, wherein doublets radially extend between said first circular frame member and said fan case.

6. The quick engine change assembly of claim 1 wherein said first circular frame member is connected to a fan case.

7. The quick engine change assembly of claim 1 wherein said first circular frame member is a fan case.

8. The quick engine change assembly of claim 1 wherein said first circular frame member is connected to a fan hub frame.

9. The quick engine change assembly of claim 1 wherein said first circular frame member is a fan hub frame.

10. The quick engine change assembly of claim 1 further comprising a plurality of single guide vanes extending from said first circular frame member toward a fan case.

11. A quick engine change assembly, comprising:
a first circular frame member;
fillets extending radially outward from radially outer portions of said first circular frame member; and
a plurality of doublet supports delimited by said fillets and spaced about said first circular frame member, said doublet supports being contoured along the axial direction;
a flow surface defined between said plurality of doublet supports; and,
a plurality of cradles, each of said cradles including said doublet supports;
said doublet supports extending from a lower portion of said cradle to said flow surface; and
further comprising a plurality of single guide vanes extending from said first circular frame member toward a fan case, said plurality of single guide vanes each having four feet at a radially inner end and at a radially outer end.

12. The quick engine change assembly of claim 1 wherein said assembly allows disconnect and removal of a propulsor.

13. A quick engine change assembly, comprising:
a continuous circular frame having a first ring and an axially opposed second ring;
fillets extending radially outward from radially outer portions of said first ring and said second ring; and
an axially extending cradle delimited by said fillets and said radially outer portions;
said cradle having bolt apertures extending in the radial direction; and
said fillets rising toward a flow path surface disposed adjacent said cradle.

14. The quick engine change assembly of claim 13, said circular frame being formed from a single piece of material.

15. The quick engine change assembly of claim 13, said circular frame being formed from multiple pieces joined together.

16. The quick engine change assembly of claim 13, said circular frame having quick engine change apertures spaced apart circumferentially.

* * * * *

UNITED STATES PATENT AND TRADEMARK OFFICE
CERTIFICATE OF CORRECTION

PATENT NO. : 9,303,531 B2  
APPLICATION NO. : 13/652962  
DATED : April 5, 2016  
INVENTOR(S) : Hasting et al.

Page 1 of 1

It is certified that error appears in the above-identified patent and that said Letters Patent is hereby corrected as shown below:

Specification

In Column 6, Line 56, delete "ring [410]" and insert -- ring --, therefor.

In Column 7, Line 14, delete "ring [410]" and insert -- ring --, therefor.

In Column 7, Line 23, delete "ring [410]" and insert -- ring --, therefor.

In Column 8, Line 51, delete "ring [410]" and insert -- ring --, therefor.

In Column 9, Line 58, delete "ring [410]." and insert -- ring. --, therefor.

In Column 9, Line 61, delete "ring [410]" and insert -- ring --, therefor.

Signed and Sealed this  
Nineteenth Day of July, 2016

Michelle K. Lee  
*Director of the United States Patent and Trademark Office*